United States Patent [19]

Rumpf

[11] 4,427,164

[45] Jan. 24, 1984

[54] CINCH LOCK FOR SAFETY BELT RETRACTORS

[75] Inventor: Robert J. Rumpf, Grosse Pointe, Mich.

[73] Assignee: The Firestone Tire & Rubber Company, Akron, Ohio

[21] Appl. No.: 390,250

[22] Filed: Jun. 21, 1982

[51] Int. Cl.³ ............................................. B65H 75/48
[52] U.S. Cl. .................... 242/107.4 R; 242/107.4 A; 242/107.4 B
[58] Field of Search ................ 242/107.4 A, 107.4 B, 242/107.4 R; 280/806; 297/478

[56] References Cited

U.S. PATENT DOCUMENTS

| | | | |
|---|---|---|---|
| 3,897,913 | 8/1975 | Hall | 242/107.4 |
| 3,985,314 | 10/1976 | Booth | 242/107.4 A |
| 4,034,931 | 7/1977 | Fisher et al. | 242/107.4 D |
| 4,149,683 | 4/1979 | Fisher et al. | 242/107.7 |
| 4,327,882 | 5/1982 | Frankila et al. | 280/806 |

Primary Examiner—Stuart S. Levy
Assistant Examiner—Lloyd Doigan
Attorney, Agent, or Firm—Miller, Morriss & Pappas

[57] ABSTRACT

A cinch lock for safety belt retractors in which a manually operated plunger acts on the lock pawl to apply a spring bias to the pawl toward lock engagement with the retractor ratchets and in prevention of webbing withdrawal independent of the automatic inertial locks and independent of associated comfort mechanisms. The plunger directly engages the pawl in only one direction of stroke and the manual lock is released and frustrated by a predetermined amount of webbing wound on the retractor spool.

4 Claims, 5 Drawing Figures

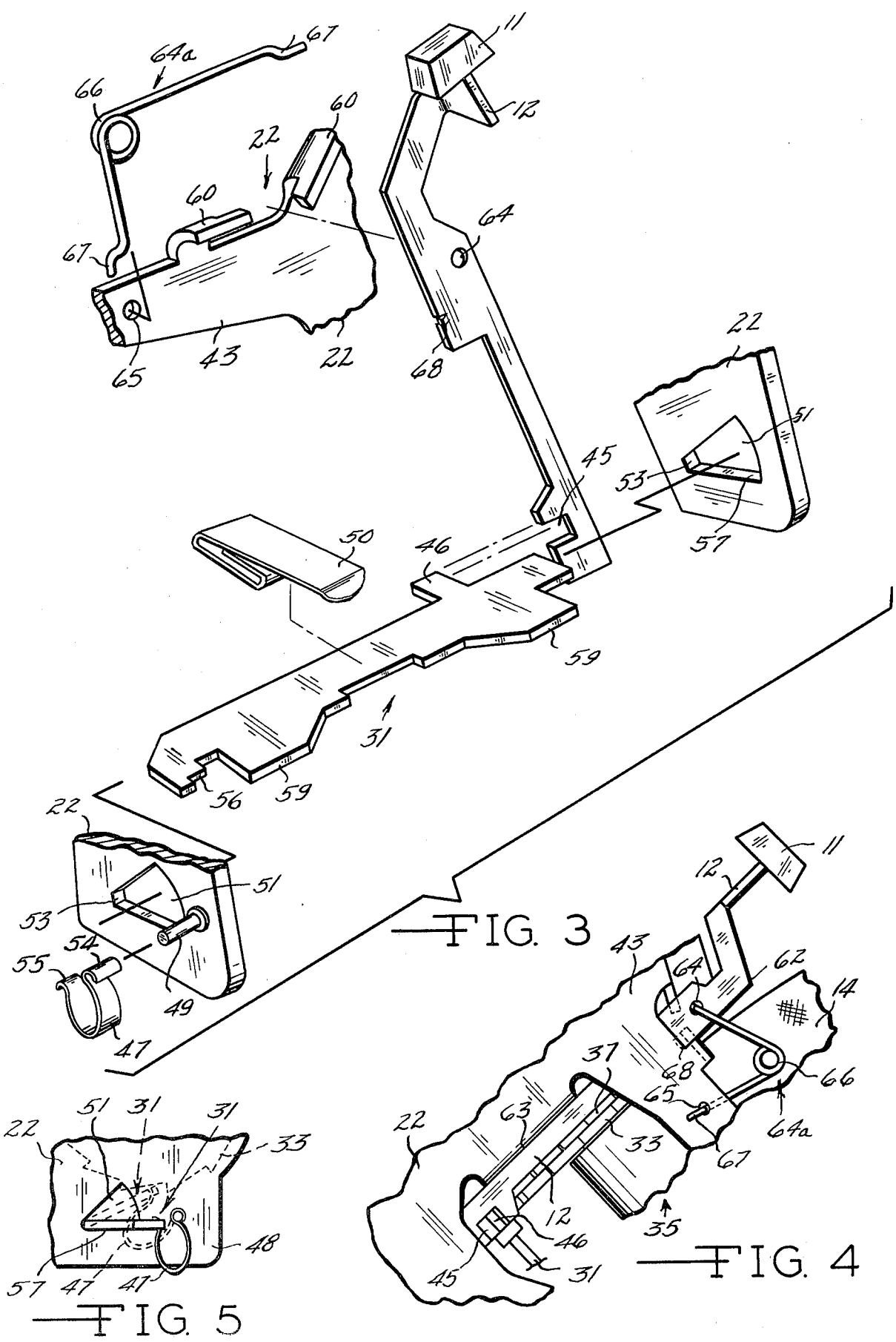

CINCH LOCK FOR SAFETY BELT RETRACTORS

The present invention comprises a manually operated lock for safety belt retractors and particularly multiple spool retractors which allows the operator to override the accessory apparatus, such as comfort mechanisms, on emergency locking features as applied to selected retractors, so that the lock pawl is manually set in prevention of any further withdrawal of webbing, whether or not inertial, or other locking forces reach the lock threshold. The cinch or overriding manual lock is released by a feeler element when webbing is retracted a predetermined amount on retraction of webbing by the spool. More particularly, the cinch lock is a manual override allowing users, for example, of vehicle sensitive plural spool retractors to achieve selective lock-up of selected of the spools without interference with the normal usage (for example, emergency locking as by vehicle sensitive means) of the plural spool retractor combination for lap and shoulder belts.

In safety belt structures for automobiles and other vehicles, it has been found desirable to utilize comfort mechanisms which isolate the user from the retracting force of the retractor motor or spring when the webbing is extended for use. These so-called comfort structures deactivate retraction and until the user reactivates the retractor no spool no rewind occurs in the webbing connected thereto. In normal vehicular usage, no problems are encountered but in vehicles such as trucks, trail vehicles, and vehicles used on rough terrain, the bouncing and jouncing of passengers and drivers causes them to be dislodged or thrown from their seats and the usual slack of the seat belt system carrying the comfort function (at the point of fastening) is such that substantial discomfort is encountered. Drivers and passengers in such vehicles under such circumstances desire to hold themselves in their seats by electing to manually lock the retractors so that no further withdrawal of webbing can occur. This holds driver and passengers firmly in position and the manual lock-up can only be released by a substantial retraction which backs the main locking pawl away from the lock ratchet.

In the prior art, the closest known approach to a structure of this general type is in the U.S. Pat. No. 4,327,882 of Franklin W. Frankila and Robert L. Stephenson in which a pawl structure can be manually locked in a dual spool retractor. The present invention is a substantial improvement in achieving a manual lock activator means and which may act to lock only a selected one of plural spools.

The present expedient of a manual cinch lock requires no major modification of comfort mechanisms, retractor structure or sensor systems and is applicable to the retractor frames which guidably carry the cinch lever and present it conveniently to the user. In safety apparatus for vehicles, it is essential that operation be simple and that the structure be effective to achieve its selected purpose. In the present instance, simplicity of override is sought in the midst of substantial control sophistication and the present invention presents a simple expedient to achieve selected manual override of other concurrently operable retractor control systems without interfering with those systems and which places reasonable optional manual lock or cinch control at the fingertips of the driver or passenger.

The objects of the present invention seek to achieve a manual override of a retractor to save lives without serious sacrifice of comfort. This is done by presenting a push button to the user of such retractor which acts directly on the lock pawl of one retractor or spool and which can be unlocked only upon retraction of webbing by the retractor and onto the spool. If the override lock is not pressed, the retractors lock automatically upon emergencies as sensed. Accordingly, in the present invention, a lock is provided which is manually selected and which operates ahead of the activating threshold of automatic locking means.

Another object is to achieve the manual lock-up election with minimum structural modification of existing retractor and retractor frame structures and to keep the usage simple and accessible to drivers and passengers in all retractor situations, but especially in the plural retractor constructions as where, for example, one retractor serves the seat or lap belt webbing and the other serves a shoulder or across-the-chest belt or webbing restraint.

Finally, an objective for design economy and for maintenance-free performance are also observed as applied to multi-terrain type vehicles in the structure of the present invention and the override lock extends from the retractor cover adjacent the fairleads or guides serving the webbing.

Other objects will be abundantly clear as those skilled in the art follow the ongoing disclosure of the manual cinch lock for safety belt retractors.

GENERAL DESCRIPTION

In general, the manual cinch lock for safety belt retractors comprises an override lock structure which includes a manual actuating lever or push button plunger which selectively reciprocates in motion against a fixed bias and which, upon depression, causes the lock pawl on one or more retractors to be biased to engage and block or lock any further withdrawal movement of the webbing from the spool of the retractor. However, this manual lock is frustrated if the plunger is pressed when the spool of webbing is full and the pawl cannot achieve its full bias position. Upon release of the "cinch" lock, the push button is reextended but the lock against withdrawal of webbing from the retractor is not terminated or released until retraction of webbing has occurred in which instance the webbing causes displacement of the pawl from the ratchet.

The user pushes the lever or plunger against a light spring return force. The lever tilts the lock bar or pawl into the lock mode against a ratchet, the ratchet usually on the spool of the retractor. As this tilting occurs, an overcenter spring is activated urging the lock bar or pawl into lock mode against the ratchet. The lever or plunger is released and is returned to its initial position. Additional manual actuation of the lever while the lock bar is biased to lock has no effect on the system since the lock positioning of the pawl has removed the pawl or lock bar from contact with the lever. This lost motion function is achieved by the simple expedient of notching the lever element so that after the initial positioning of the latch bar there is no further contact with the lever element until the latch bar or pawl resumes its initial position as by retraction of webbing on the spool to an extent where a webbing feeler on the pawl is engaged by the roll of webbbing and this then forces the lock bar or pawl away from contact with the lock ratchet. This retreat of the pawl advances to a point where a small overcenter spring between frame and pawl is popped away from the lock bias and the pawl or lock bar is then restored to its original unlocked rest condition. When webbing is again withdrawn, for example to a comfort position dictated by the manipulation of the user, then the feeler is free of the webbing and the cinch lever or plunger can be effectively pressed to achieve manual lock-up and this cocks the small overcenter spring to bias contact of the lock bar against the ratchet. The retractor spool provides the toothed ratchet. The retractor frame provides lineal journalling for the lineally movable lever and a spring acting between cinch lever-plunger and the frame assures return of the cinch lever and button when it is released. The lever includes a push button at its outer operator end and one finger movement in a plunger-like action sets the manual cinch lock when the retractors have completed their task of serving up webbing to the fastened safety belt extended position around the wearer and the comfort mechanism is functioning. As applied to comfort mechanism dual spool retractors, the cinch lock is applicable to selected of the spools. Used with a boot or decorative retractor cover, the cinch lever of the present invention extends from an escutcheon plate defining the webbing orifice and positioning the cinch button serving the particular webbing.

Physically, a lock bar or pawl of the retractor spool to be locked by the cinch lever is modified in a multiple spool retractor by providing a depending tang or extension off-center from the pivot points or the tilt axis of the lock bar. The lever rests on the frame and is lineally guided by channel-like upsets lanced from and formed in the frame. The lever is biased outwardly in resistance to its depression by a spring acting between the frame and the lever and urging return of the lever to its outermost position. The outermost position is in the direction of the push button capping one end of the lever as fully extended against a stop in the lineal journalling. The end of the lever opposite the push button is slotted to move the lock bar tang only when the lever is depressed. This allows the lever to freely return after completion of setting the lock bar in bias against the ratchet portion of the spool and in selected prevention of further extension of webbing from the spool. The bias is achieved since the selected tilting of the lock bar also activates an overcenter spring which urges contact of the latch or lock bar against the spool ratchet. This bias prevails until the retractor functions to draw back or retract the webbing. As retraction of the webbing occurs, the webbing stored on the reel or spool increases to finally and selectively engage the feeler which is secured to and extends upward from the lock bar. This webbing engagement with the feeler overcomes the bias of the overcenter spring and the pawl or lock bar is thereby tilted away from any possible lock contact with the ratchet and the overcenter spring is relaxed awaiting selected push button lever actuation as the operator wishes. Until this restoration of condition, the manual lock against withdrawal of webbing from the spool is maintained. Automatic sensors as used in vehicle sensitive retractors are not interfered with and the simplicity of the installation is clear.

Accordingly, a manual lock structure is provided for a safety belt retractor in which a frame having channel-like supports operably journals at least a single safety belt webbing spool with ratchet flanges. A retractor motor is drivably connected to each of the spools and each spool includes a pawl element lockably engageable against the ratchet flanges of the respective spools. The pawls of the present invention are prevented from contacting the ratchets by a feeler on the pawls which is selectively engageable with webbing on the respective spools. A condition sensing element such as a pendulum-lever structure is operably connected to said pawls (as by a pilot linkage) for selectively urging the pawls toward lock engagement with the pawl upon the sensing of an emergency. In addition, an overcenter spring secured to the frame and to the pawl element applies a bias against the pawl toward closure against the ratchet. This is achieved by a manually activated plunger-lever operable in only one direction to shift the overcenter spring to the lock bias condition. A return spring is connected to the frame and to the plunger-lever biasing the plunger-lever to return to its normal out-of-control contact with the overcenter spring. The movement of the pawl by the plunger-lever can occur only upon depression of the plunger-lever against its return spring bias. This is achieved by lost motion means as between plunger-lever and pawl in one direction of travel. The plunger-lever achieves movement of the pawl by physical engagement with a depending tang or dog. The return movement of the plunger-lever is free of the tang or dog.

IN THE DRAWINGS

FIG. 3 is an exploded perspective view of the cinch lock lever in relation to the lock bar and webbing feeler and related to elements of the retractor frame. The windows are indicated in the retractor frame and provide pivots and limit pivoting of the lock bar or pawl in the retractor frame. The showing includes the overcenter spring acting between frame and lock bar.

FIG. 4 is a bottom plan fragmental view of the present invention cut away to indicate the rest position of the cinch lever biased outwardly by the return spring and with the (lost motion) notch in the lever straddling the depending tang or dog of the pawl. The frame is shown in its guidance role for the cinch lever.

FIG. 5 is a partial side elevation view of the frame at the butterfly window opening supporting the lock bar or pawl and indicating the overcenter spring acting between the lock bar and frame and in phantom line indicating the lock bias imposed by the manual selection using the cinch lever-plunger.

SPECIFIC DESCRIPTION

Figure 1:
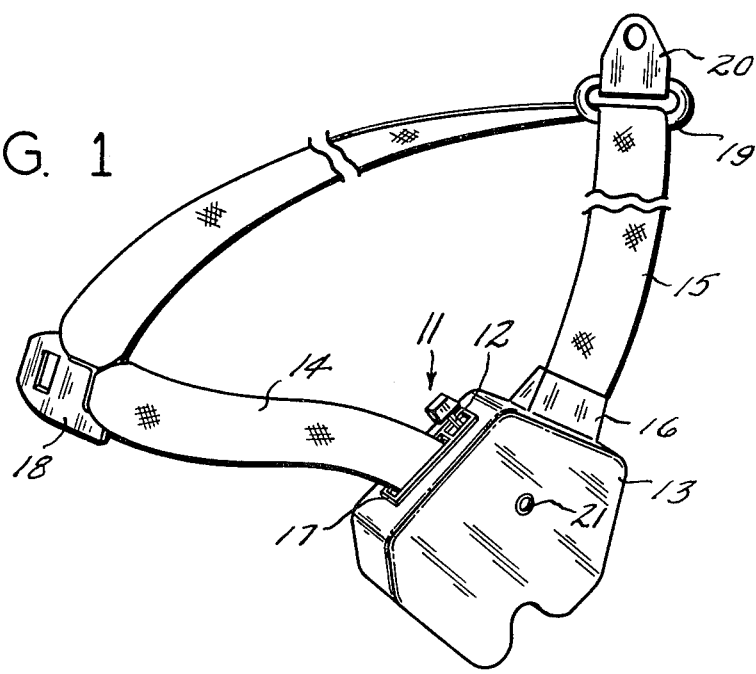
FIG. 1 is a perspective view of a dual spool retractor having a push button cinch lever or plunger in accord with the present invention and serving one of plural webbing portions presented. The mechanism is shown encased in a protective and decorative cover or boot.

Referring to the drawings and with first specificity to the FIG. 1 thereof, the present invention is seen as exposed to the driver, passenger or user as a push buttom 11 connected to the outer end of a cinch lever or plunger 12 in a boot or cover 13 which protectively and decoratively encases a seat belt retractor assembly and from which, retractably extend, a pair of webbing courses 14 and 15. A flow director 16 is shown guidably leading the course 15 and escutcheon plate 17 serves to guide the course 14 from the boot or cover 13 and to trim the push button 11. The webbing courses 14 and 15 may be interrelated by connection at the buckle tongue 18 and the anchor ring 19 and are connected as by anchor plate 20 to provide a running fixed connection as, for example, on the door post or at the connection of body to top or ceiling in automotive construction, not shown. Typically this type of harness, as illustrated, utilizes the webbing 14 for a torso or lap belt restraint and the belt or webbing portion 15 then provides an over-the-shoulder or upper body support. The construction illustrated will be seen to be characteristic of a plural retractor installation using a common frame, common inertial sensor and interrelated accessory structure such as comfort mechanisms serving the spools or reels and the like. The fastener 21 provides a typical means for securing the boot or cover 13 to the frame. In operation, after the webbing has been extended and connected, the comfort mechanisms such as the mechanism characterized in U. S. Pat. Nos. 4,034,931 and 4,149,683 to Robert C. Fisher and Cecil A. Collins is activated to relieve the user from the retractor tension on the extended webbing. This does not interfere with the vehicle sensitive characteristics of the retractor structure to lock against extraction of webbing as emergency inertial conditions demand, but on rough terrain a substantial component of force may extend the webbing as, for example, by repetitive vertical components of force experiences by trucks and the like in bouncing and jouncing. Under such terrain conditions, it is desirable to apply a manual cinch or override lock which is easily selected and set manually by the driver or passengers so that no extension of webbing from the selected spool can occur until there is a reset of the initial conditions as when a predetermined amount of retraction is achieved. This cinch lever 12 is accessible by push buttom 11 usually applied only to the lap belt 14 side of the integrated construction. By this means the user is held to his seat without banging his or her head on the roof or other parts of the vehicle. In brief, the cinch lever 12, activated by pressing the push button 11 down, causes immediate and overriding locking against any further extension of webbing from the retractor spool serving the webbing course 14, as shown.

Figure 2:
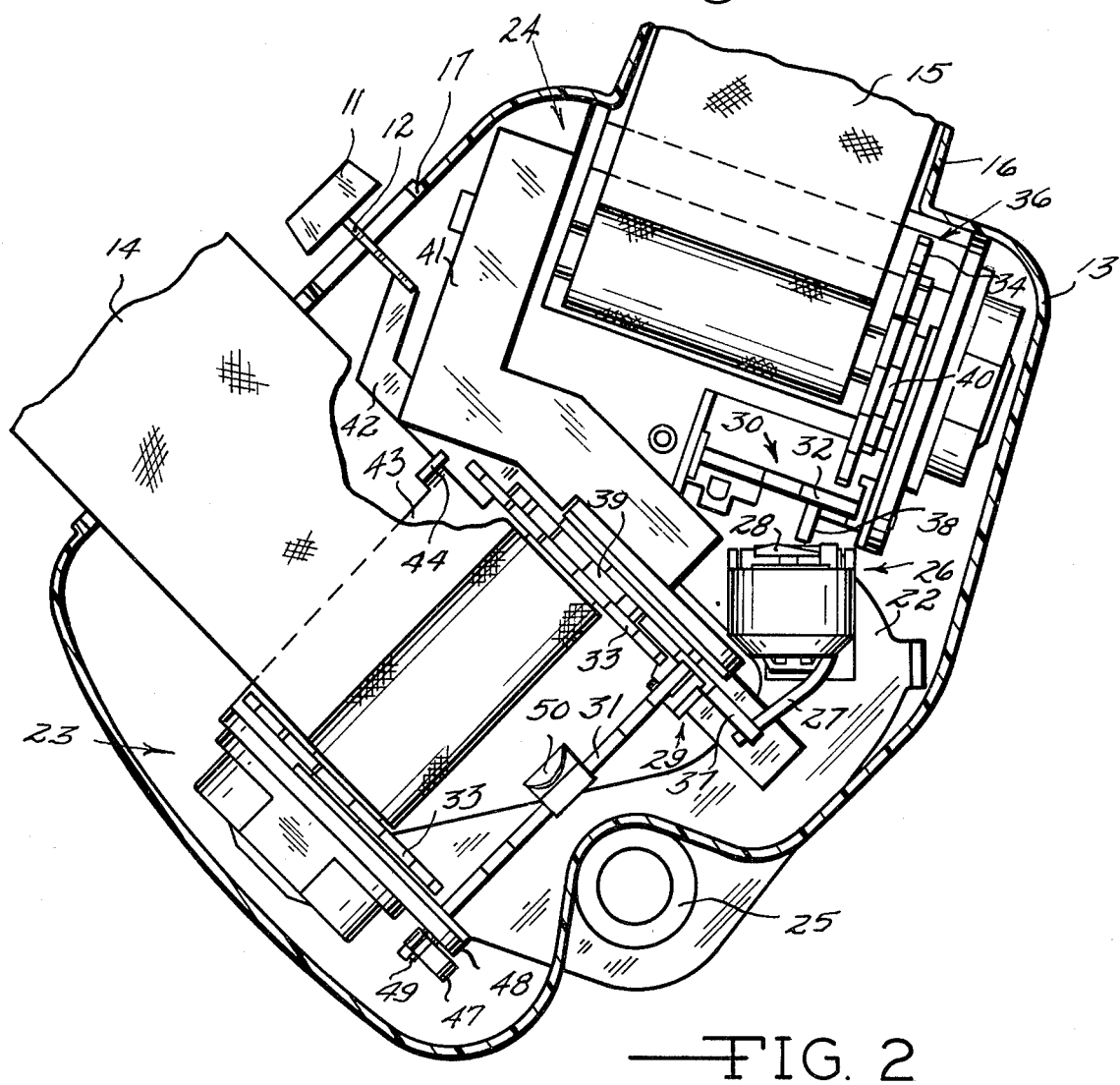
FIG. 2 is a cut-away plan view of the structure in FIG. 1 and indicating the plural retractor spools locked by a common vehicle sensitive inertial sensor and one of the spools having manual cinch lock means in accord with the present invention. Both spools are served by housed comfort mechanisms.

In FIG. 2 the construction within the boot 13 is revealed in the form of the frame 22 supporting the two retractor assemblies 23 and 24 and the frame 22 also includes mounting or anchor means 25 for connection of the frame 22 to selected structural portions of a vehicle as convenient to a particular safety seat belt harness and geometry arrangement.

A pendulum type inertial sensor 26 is supported by the frame 22 and as seen in the FIG. 2 the vertical axis through the sensor 26 is shown in the vertical position and in variant angular relationships to the spools of the two retractors 23 and 24. In general, the pendulum experiences displacement when inertial conditions resulting from acceleration, braking, or stopping of the vehicle occurs. Then the sensor levers 27 and 28 are acted upon to displace locking apparatus 29 and 30, respectively, and even sequentially where desired. The locking apparatus 29 and 30 are usually linkage elements connected as between pendulum sensor and locking means in the retractors 23 and 24, respectively, activated by the displacement of pendulum lever or sensor elements 27 and 28 which tilt the pawls or lock bar elements 31 and 32, respectively, against the ratchets 33 and 34 of the spools 35 and 36 of the retractors 23 and 24, respectively. This results in a driving lock of the lock bars 31 and 32 against the ratchets 33 and 34, respectively, as a consequence of the drive linkage of pilot pawls 37 and 38 engaging the pilot ratchets 39 and 40 keyed to the respective spools 35 and 36. The pilot pawl elements 37 and 38 are accordingly compelled by the pilot ratchets 39 and 40 to tilt the lock bars or main pawls 31 and 32, respectively, into locking engagement and in prevention of retraction from the spools 35 and 36, respectively, responsive to forces displacing the pendulum sensor 26 and causing webbing withdrawal as the wearers of the webbing move forward inertially.

A comfort mechanism in housing 41 and secured to the frame 22 acts upon the retractors 23 and 24 to selectively disengage the retraction motor function of the retractors 23 and 24 and prevents the webbing tension in the extended webbing from being felt by the users. Such a mechanism is generally presented in U.S. Pat. Nos. 4,034,931 and 4,149,683.

Also supported by the frame 23 in the manner of a lineal guide and bearing is the cinch lever 12 of the present invention. The flat portion 42 of the lever 12 rests flush against the inner web face 43 of the frame 22 and the lever 12 is guided in its limited stroke movement by extensions such as 44 which line and define the stroke of the cinch lever 12. As will be seen, the lever 12 is configured to avoid interference with apparatus of the retractor structure 23 in the boot 13 while operably reaching the lock bar or pawl 31. The lever 12 passes through the escutcheon plate 17 in an orifice provided therefor. The plate 17 also acts as a flow director for webbing 14. A notch 45 (not visible in FIG. 2) will be seen to engage a depending tang or dog extension 46 (not visible in FIG. 2) from the lock bar or pawl 31. This is an interference engagement and as the push button 11 completes its stroke in moving the lever 12, the notch wall causes the tang 46 and lock bar 31 to tilt on its axis toward the ratchets 33 of the spool 35. As this tilting occurs, the overcenter spring 47 is activated and provides a bias acting on the frame 22 at support flange 48 through the pin 49 and against the lock bar 31. The application of this bias by means of overcenter spring 47 continues against the lock bar 31 eccentric from the pivot axis of the lock bar 31 and, once activated by the lever 12, the bias locking against webbing withdrawal remains in force independent of any repetitive reciprocating motion of the cinch lever 12. This locks the retractor 23 against any further withdrawal of webbing and the webbing 14 holds the user of the present invention in place through the rigors of rough terrain.

Retraction can occur subject to release of the disabling function of the comfort mechanism in housing 41 applied to the retractors 23 and 24. Release from the retraction disablement, however, restores the retraction capabilities of the retractor 23 and as webbing 14 is wound on the spool or reel 35 it engages the webbing feeler 50 on the lock bar 31 at a predetermined point and the retracted webbing 14 overcomes the bias of overcenter spring 47 and restores the lock bar 31 to its rest or starting position, as shown. A lever spring, not visible in the FIG. 2, returns the cinch lever 12 and push button 11 to the position seen in FIG. 2 when the push button 11 is released. It is thus seen that the cinch lock lever 12 can only be set when the webbing 14 has been withdrawn beyond contact with the feeler 50 and once set the lock bar 31 is retained engaged against the ratchets 33 until retraction of the webbing 14 restores the bar 31 free of the bias of overcenter spring 47. Expressed differently, the overcenter spring 47 (once set) is not repositioned by added plunger movement of the lever 12 and has no further control over the lock bar 31 until rewind on the spool 35 has occurred and the pawl 31 has been tilted away from the ratchets 33.

In FIG. 3 the support flange 48 of the generally channel shaped retractor frame 22 pivotally and operably supports the spool 35 and also includes one of the registering butterfly type windows 51. The other registering window 31 is in the flange 52. These windows 51 provide at each of their apexes 53 a pivot point for the latch bar or pawl 31. The windows 51 limit the angular movement of the latch bar 31, as can be seen. The pin 49 retains the overcenter spring 47 at one curied end 54 of the spring 47. The other free end 55 of the spring 47 is compression engaged with the shoulder 56 in the pawl element 31 in a geometry expressed in the FIG. 5 to provide an overcenter bias operation in two selected directions, one toward contact with the ratchet teeth 33 and the other causing the lock bar 31 to rest against the outermost surface 57 of the windows 51. As will be appreciated, the movement to the bias toward and against the teeth or ratchet 33 of spool 35 is the consequence of depression of the cinch lever or plunger 12 by depressing the button 11. The notch 45 of the lever 12 straddles the tang 46 of the pawl element 31 and as the lever or plunger 12 is pressed, the lock bar 31 pivoting on its edge 58 in the windows 51 is thrusted toward the ratchet 33. However, if the feeler 50, connected to the lock bar or pawl 31 is engaged with webbing 14 wound on the drum or spool 35 so as to prevent the pawl 31 from contacting the ratchets 33, the manual set of cinch lever 12 is frustrated. When a predetermined amount of webbing 14 has been withdrawn, then the pawl lock shoulders 59 can engage the ratchet 33 and the overcenter spring 47 is effective to retain the bias against the ratchet 33 and the webbing 14 is prevented from further withdrawal of webbing 14 from the spool 35. The notch 45 of lever 12 has a width in excess of the thickness of the pawl tang 46 so that upon depression of the push button 11 and cinch lever 12, the pawl 31 is tilted toward engagement with the ratchet 33 and then upon release of the push button 11 the lever 12 is biased to return to its extended starting position as urged by the lever return spring 64a acting between lever 12 and frame 22. The return travel of the lever 12 is the distance of the notch 45 so that the return of the lever 12 is accomplished with no physical engagement of lever 12 and tang 46 in notch 45. It should be appreciated that lever 12 is guided in its plunging motion by the guide flanges 60 with their respective overlap tabs 61 and 62 integral with the frame 22. A similar flange 63 (best seen in FIG. 4) provides further guide-journalling and that flange 63 is raised and is integral with the frame 22 and flanks the lever 12.

The return bias spring 64a is applied to the lever 12 by attachment to the lever 12 at the opening 64 provided therein and by attachment to the frame 22 at the opening 65. The spring 64a is a spring wire having an intermediate coil portion 66 and with retainer jogs 67 at the ends. The jogs 67 slip into the two openings 65 and 64 and maintain the spring 64a in a flat nested compression stressed manner generally parallel to the web portion 43 of the frame 22. A stop 68 such as the raised portion shown on the lever 12 limits overrun of the lever 12 as by limiting engagement with the overlap tab 62. The spring 64a assures the engagement against the tab 62 unless the push button 11 is depressed. The lever 12 is configured otherwise to move flush against the web 43 of frame 22 and to avoid interference with any of the journalling or operational apparatus serving the spools 35 and 36.

In FIG. 4 the relationship of the lever 12 is better appreciated with the spring 64a compressed in its bias role and urging the lever 12 and push button 11 outwardly with stop 68 resting against tab 62. In this position the notch 45 is positioned free of the tang 46 of pawl 31 but in an interference path in respect to the dog or tang 46. As the push button 11 is depressed, the tang 46 is moved with the corresponding movement of pawl bar 31 and upon release, the push button 11 returns to the extended position shown. If sufficient webbing 14 has been removed from the spool 35 to free the feeler 50, then the pawl 31 is moved by the lever 12 toward engagement with the ratchets 33 until the overcenter spring 47 (FIG. 5) applies a bias holding the pawl 31 against the ratchet 33 even after release of the lever 12 and push button 11. This lock mode is retained in prevention of any further extension of webbing 14 from the spool 35. The lock mode continues until retraction of webbing 14 winds sufficient webbing 14 on the spool 35 so that the feeler 50 overcomes the bias of the overcenter spring 47 and restores the pawl lock 31 to the unlocked position. Since the pilot pawl 37 and its pilot ratchet 39 achieve automatic locking responsive to the inertial sensor 26 (pendulum type) and attendant withdrawal of webbing 14, the light bias of the overcenter spring away from engaging the pawl 31 against the ratchets 33 is easily overcome. Thus, the cinch lever 12 does not interfere with automatic locking against extraction and the automatic locking on an intermittent basis causes an overcenter condition on the spring 47 biasing toward lock-up against extraction even after restoration from the emergency situation sensed by the sensor 26 and until sufficient retraction of webbing 14 occurs to shift the overcenter spring 47 away from the lock mode. This is best appreciated in the FIG. 5 where the two positions of the overcenter spring 47 are shown and the resulting movement or position of the pawl 31 is seen. In phantom line the position engaging the pawl 31 against the ratchets 33 is shown. In full line the overcenter spring 47 is indicated lightly biasing the pawl 31 against the abutment or rest shoulder 57 formed by the outermost surface in the window 51.

Having thus described my invention and in particular the best mode therefor, those skilled in the art will perceive improvements, changes and modifications and such improvements, changes and modifications within the skill of the art are intended to be included herein limited only by the spirit and scope of the hereinafter appended claims.

I claim:

1. A manual lock structure for safety belt retractors in which a frame having a generally channel shaped journal means in support of at least one webbing spool and the webbing spool has ratchet flanges, a retractor motor drivably connected to said spool, and including a pawl lockably engageable against said ratchet flanges and held out-of-contact therewith by a feeler element selectively engageable against the webbing of said spool, and a condition sensing element operably connected to said pawl and urging said pawl toward engagement with said ratchet flanges upon sensing an emergency comprising:

an overcenter spring secured to said frame and to said pawl element and in a first position applying a bias against said pawl toward locking against said ratchet flanges and in a second position biasing said pawl away from contact with said ratchet flanges;

a manually activated plunger-lever operable in only one direction to shift said overcenter spring to a said first position; and a return spring connected to said frame and to said plunger-lever and returning said plunger-lever to its normal position out-of-control contact with said overcenter spring.

2. In the combination of claim 1 wherein said plunger-lever is engaged with said pawl in only one direction of stroke.

3. A manual override lock in a retractor structure of one or more webbing storage spools, each of said spools having ratchet flanges with retractor motors on a common frame and with a lock pawl for each spool locking said spools against webbing withdrawal and with an inertial sensor secured to said frame and operably connected to move said pawls to lock position against webbing withdrawal and at least one of said pawls having a spring-like webbing feeler holding said pawl away from said ratchet flanges until a selected amount of webbing has been removed from said spools, the combination comprising:

a push button plunger element journalled by said frame for limited lineal reciprocal movement;

an actuating dog depending from at least one of said pawls and in an interference path with said plunger element in only one direction of movement of said plunger element;

a spring connected to said frame and said plunger element and urging said plunger element to a rest position out-of-contact with said actuating dog; and an overcenter spring connected between said frame and said pawl and said overcenter spring selectively applying a first bias to said pawl toward lock against withdrawal of webbing from said spool and a second bias away from said spool.

4. In the combination of claim 3 wherein said override lock acts on only one of said spools and all of said spools are connected to retractor comfort mechanisms, the inclusion of a stop means on said plunger element engageable with said frame element and limiting return movement of said plunger by said spring connected to said frame and said plunger element.

* * * * *

UNITED STATES PATENT AND TRADEMARK OFFICE
CERTIFICATE OF CORRECTION

PATENT NO.   :   4,427,164
DATED        :   1984 January 24
INVENTOR(S)  :   Robert J. Rumpf It is certified that error appears in the above-identified patent and that said Letters Patent is hereby corrected as shown below:

Column 4, line 60, "buttom" should read
    --- button ---

Column 5, line 35, "buttom" should read
    --- button ---

Column 6, line 18, "frame 23" should read
    --- frame 22 ---

Column 7, line 12, "curied" should read
    --- curled ---

Signed and Sealed this

Thirty-first Day of July 1984

[SEAL]

*Attest:*

GERALD J. MOSSINGHOFF

*Attesting Officer*     *Commissioner of Patents and Trademarks*